United States Patent
Tai et al.

(10) Patent No.: US 7,111,809 B1
(45) Date of Patent: Sep. 26, 2006

(54) AIRCRAFT EXCESSIVE FUEL DUMPING EJECTION PARALLEL TO FLIGHT DIRECTION

(75) Inventors: Tsze C. Tai, Potomac, MD (US); Steven A. Woods, Mechanicsville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/988,402

(22) Filed: Nov. 12, 2004

Related U.S. Application Data

(60) Provisional application No. 60/580,396, filed on Jun. 18, 2004.

(51) Int. Cl.
*B64D 37/26* (2006.01)
(52) U.S. Cl. .................................. 244/135 R; 244/136
(58) Field of Classification Search ................ 244/1 R, 244/136, 135 R; 239/171; 137/264; 222/132
See application file for complete search history.

(56) References Cited

U.S. PATENT DOCUMENTS

| | | | | |
|---|---|---|---|---|
| 2,248,308 A | * | 7/1941 | Rice | ........................ 244/135 R |
| 2,650,781 A | * | 9/1953 | Taylor | ........................ 244/198 |
| 3,096,054 A | * | 7/1963 | Ciminaghi | ............... 244/135 R |
| 5,655,732 A | * | 8/1997 | Frank | ........................ 244/1 R |
| 2002/0088901 A1 | * | 7/2002 | Moreland | ................... 244/136 |

OTHER PUBLICATIONS

Paper entitled"Simulation and Analysis of V-22 Aircraft Fuel Dumping,"Tsze C. Tai, presented at 42nd AIAA Aerospace Sciences Meeting & Exhibits, Jan. 5-8, 2004, 16 pages.
U.S. Appl. No. 60/580,396, filed Jun. 18, 2004 entitled "Aircraft Fuel Dumping During Flight".

* cited by examiner

*Primary Examiner*—Galen Barefoot
(74) *Attorney, Agent, or Firm*—Jacob Shuster

(57) ABSTRACT

Excessive fuel is dumped by ejection under a pressurized outflow velocity from an aircraft during flight as jets in a direction parallel to air stream flow relative to the aircraft, from a rearwardly facing exit opening of a fuel jettison device mounted on the lower surface of the aircraft, with the exit fixedly spaced below the lower aircraft surface a short distance to avoid the Coanda effect while reducing or eliminating fuel and fuel mist impingement on aircraft surfaces.

2 Claims, 1 Drawing Sheet

AIRCRAFT EXCESSIVE FUEL DUMPING EJECTION PARALLEL TO FLIGHT DIRECTION

CROSS-REFERENCE TO RELATED APPLICATION

This application claims the benefit of U.S. Provisional Application No. 60/580,396 filed Jun. 18, 2004, entitled "AIRCRAFT FUEL DUMPING DURING FLIGHT", incorporated herein by reference.

The present invention relates generally to a method and apparatus for the dumping of excessive fuel from an aircraft.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The dumping of excessive fuel from an aircraft before landing may be necessary as a safety measure. Heretofore such dumping of fuel by ejection of fuel jets from the aircraft resulted in extensive fuel mist impingements on aircraft surfaces, such as the lower tail surface portions thereof. Attempted solutions to such fuel mist impingement problem heretofore involved aircraft flight at a low angle of attack, such as seven degrees (7°). However surface impingement still occurred because of the directional swerve of emerging fuel jets from the aircraft. It is therefore an important object of the present invention to provide for ejection of fuel from aircraft during flight with reduced or eliminated fuel mist surface impingement while avoiding other disadvantages associated with prior attempted impingement problem solutions.

SUMMARY OF THE INVENTION

Pursuant to the present invention, the lower surface of an aircraft fuselage mounts a fuel jettison device having a rearwardly facing exit opening from which excessive propulsion generating fuel is dumped by ejection under pressure in a direction parallel to air-stream flow relative to the aircraft fuselage during flight. The fuel to be dumped is supplied to the fuel jettison device through a short fuel line extending therefrom into the lower surface of the aircraft fuselage. The exit opening of the fuel jettison device is thereby spaced and fixedly positioned a short distance below the lower aircraft surface to avoid the Coanda effect by directing ejection parallel to the air-stream flow.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
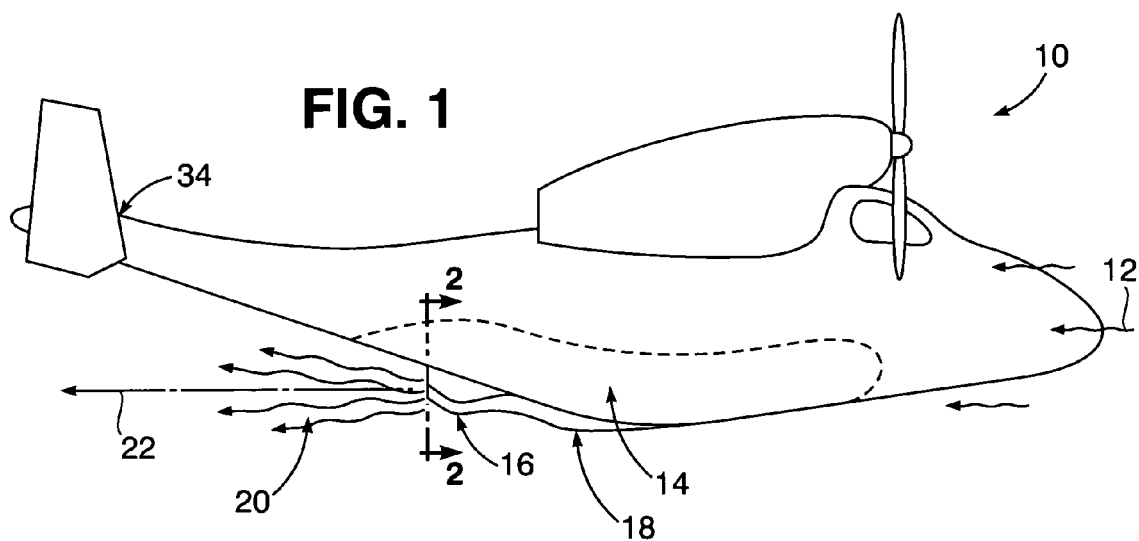
FIG. 1 is a side elevation view of a propelled driven aircraft during flight.
Figure 3:
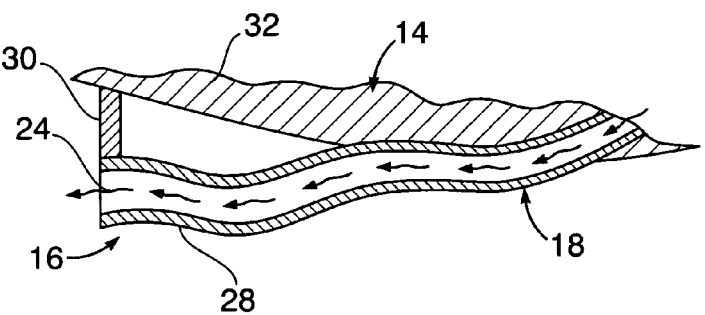
FIG. 3 is a partial section view taken substantially through a plane indicated by section line 3—3 in FIG. 2.
Figure 2:
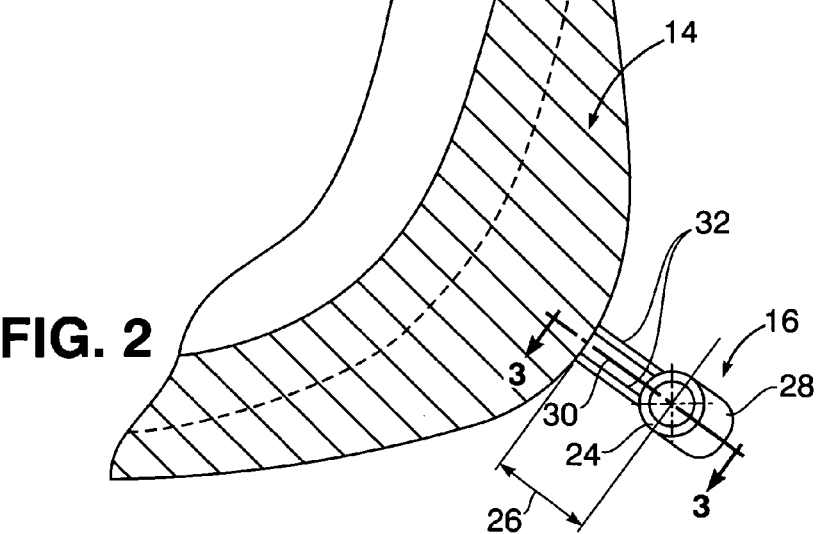
FIG. 2 is a partial section view taken substantially through a plane indicated by section line 2—2 in FIG. 1.

Referring now to the drawing in detail, FIG. 1 illustrates an aircraft 10, such as a propeller driven V-22 type, undergoing flight to induce air stream flow relative thereto in a direction 12. The outer surfaces of the aircraft includes a lower fuselage surface component or sponson 14 on one lateral side of which a jettison device 16 is mounted as shown in FIGS. 1, 2 and 3 for dumping excessive fuel not utilized for aircraft propulsion. The excessive fuel extracted under pressure from inside the aircraft 10 is fed to the device 16 through a relatively short supply line 18, extending into the sponson 14 from the jettison device 16 as shown in FIG. 3. The fuel is accordingly dumped by ejection as jets 20 at a velocity of 10 ft./sec. from the jettison device 16 in a direction 22 generally parallel to the air stream flow direction 12 before landing of the aircraft 10.

The fuel jets 20 emerge from the jettison device 16 through a rearwardly facing circular exit opening 24 in a fixed position at rear end of the supply line 18 as shown in FIGS. 2 and 3. The exit opening 24 is thereby spaced a short distance 26 below a lower end of the sponson 14 as shown in FIG. 2, such as five (5) inches, to thereby avoid the Coanda effect. Furthermore, the initial emergence of the fuel jets 20 from the exit opening 24 in the direction 22 parallel to the air stream reduces or eliminates fuel mist impingement on the rear tail end surface portion 34 of the aircraft 10. Complete elimination of fuel mist impingement is thereby assured when the aircraft 10 is flown at an angle of attack of seven degrees or lower.

As shown in FIGS. 2 and 3, the jettison device 16 located on one side of the sponson 14 includes a nozzle tube end portion 28 on which the exit opening 24 is formed and extending from the fuel supply line 18 which extends into the aircraft 10 through the sponson 14. The exit end 24 of the nozzle tube portion 28 is fixedly spaced below the sponson 14 by a support 30 to establish and maintain the aforementioned spacing distance 26. A pair of side support plates 32 also interconnect and mount the nozzle tube portion 28 on the side of the sponson 14.

While the advantages of the present invention associated with use of the jettison device 16 as hereinbefore described are applicable to the lower portion of the V-22 type propeller driven aircraft 10 as shown in FIG. 1, it is also applicable to other types of jet or propeller powered aircraft which involve combustion of fuel. Also jettison exit openings differently shaped from that of the circular exit opening 24 may be utilized as long as they are fixedly positioned for emergence of the jets 20 in a direction parallel to the air-stream flow direction 12.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an aircraft having a lower fuselage surface portion from which excessive fuel is to be dumped during flight, a system for dumping the excessive fuel during said flight of the aircraft, comprising: a fuel supply line on the lower surface portion of the aircraft to which the excessive fuel is fed; and fuel jettison means connected to the fuel supply line for ejection of the excessive fuel as jets from a fixed location spaced below said lower fuselage surface portion in a fixedly established direction parallel to air stream flow relative to the aircraft during said flight thereof, wherein said fuel jettison means includes a nozzle having a rearwardly facing exit opening from which said fuel jets emerge at said fixed location in the direction parallel to the air stream flow, wherein said exit opening is spaced below the lower surface portion at said fixed location by five inches so that said fuel jets are ejected therefrom under pressure at a velocity of 10 feet per second.

2. The combination as defined in claim 1, wherein said fuel jettison means further includes: support means for mounting the nozzle with the exit opening at said fixed location to avoid Coanda effect.

* * * * *